May 3, 1955  E. T. CRIPPS  2,707,325
LOBSTER PICK
Filed Sept. 30, 1952
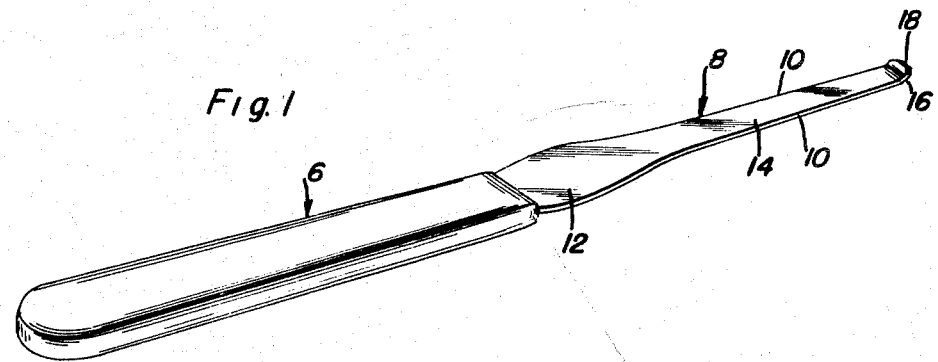
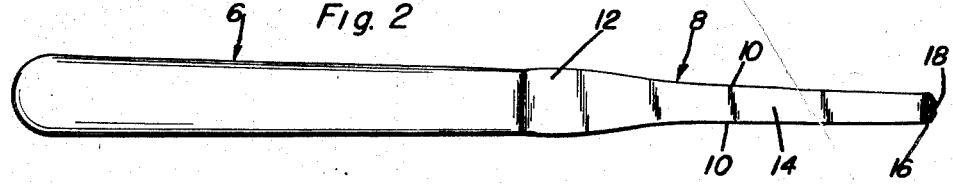
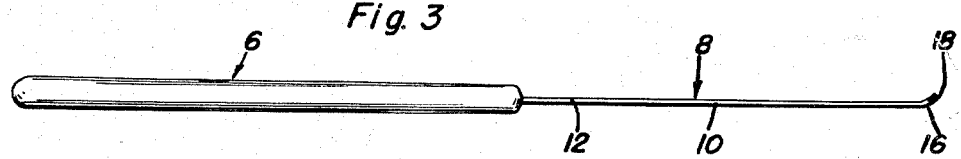
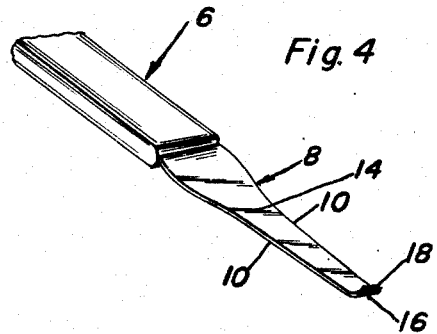
Ernest T. Cripps
INVENTOR.

United States Patent Office 2,707,325
Patented May 3, 1955

2,707,325

LOBSTER PICK

Ernest T. Cripps, Stonington, Maine

Application September 30, 1952, Serial No. 312,317

1 Claim. (Cl. 30—1)

The present invention relates to a new, useful and improved implement herein designated as a lobster pick, that is, a specially designed and structurally unique pick, the use of which enables one to handily employ the special facilities provided during the act of dislodging and freeing meat for ready eating of the same.

Special implements such as fresh oyster shucking knives, shrimp cleaners and the like have been offered to the trade, most of the same being particularly adapted for use by workers in preparing such edibles for canning, packing and other purposes. There has long existed a need for a similarly performing but radically distinct implement to assist one in gouging and rooting out meat from cooked ready-to-eat lobsters.

The object of the instant invention is to provide just such an instrumentality which, while it could be employed by workers to assist them in handling certain packing chores, is adapted to serve as a pick for use in a restaurant, the home and elsewhere, and which is expressly made and designed to enable a user to handily employ the same during the act of dislodging and freeing the meat with requisite nicety and intact form for unencumbered eating.

In order to scoop and withdraw the meat from the lobster shell, experience has shown that it is necessary to have a resiliently flexible blade with a terminal hook. Therefore, in carrying out the principles of the invention, a handle equipped blade is provided with a correctly fashioned hook on its free end functioning to catch hold of and pull the meat out of the shell with a minimum of effort and embarrassment. It follows therefore, that the implement disclosed is one which is designed to meet endorsement by manufacturers, restaurant owners and users generally speaking.

More specifically, the invention has to do with a stainless steel lobster pick adapted to form a complement to a regulation table set-up for the serving of lobsters in a restaurant, the home, or elsewhere comprising a unitary implement resembling a table knife and having a conventional style knife-handle and a gouging blade integral with said handle, said handle being rigid and relatively heavy and aptly usable as a weight while cracking body and claw shells, said blade being flexibly resilient and comparatively short to meet the special requirements at hand, being wide at its junctural connection with the handle and then gradually decreased in width toward its outer free end, the latter terminating in a short oblique-angled bend having a blunt and arcuately rounded tip, said bend serving as hook which latter expedites the technique scooping and dragging the meat from its otherwise limitary regions.

Other objects, features, and advantages will become more readily apparent from the following description and the accompanying sheet of drawings.

In the accompanying sheet of drawings, wherein like numerals are employed to designate like parts throughout the same:

Figure 1 is a perspective view of a lobster pick constructed in accordance with the principles of the present invention.

Figure 2 is a top plan view of the same.

Figure 3 is an edge elevation of the same.

Figure 4 is a fragmentary perspective view observing the features of construction from a point of view different from that pursued in connection with Figure 1.

Referring now to the drawings by way of reference numerals and lead lines, the unique lobster pick or implement is characterized generally by a handle 6 and a complemental integral axially aligned blade 8. In order that the instrument will be practicable and non-corrodible, it is constructed by preference from stainless steel. The over-all implement resembles a table knife and as before stated, the same is intended to function as a complement to a regular table set-up of knives, forks, and spoons and the shape shown and the material utilized permits the same to harmonize with such utensils. As a matter of fact, the handle 6, is about the length of a conventional knife handle and it looks like the ordinary knife handle. The main distinction however, is that it is of sufficient heaviness that it functions as a weight and is used as an impact member for cracking body and claw shells, in an obvious manner. Knives of solid metal handle types have perhaps been used as shell crackers although this is not satisfactory due to the fact that the handle is too light in weight and moreover, the ordinary knife blade has at least one sharp edge and the blade is dangerous to catch hold of. In the instant case, blade 8 has longitudinal edges 10—10 which are non-sharpened and hence the blade can be used alternatively as a satisfactory handle when employing the handle 6 as a cracking tool. The blade is flexible, resilient and comparatively short to meet special requirements at hand and is relatively wide where it is joined or connected with the adjacent end of the handle.

The blade from thereon is attenuated and gradually narrowed toward the free outer end. This tapered or narrowed portion of the blade is denoted by the numeral 14. The outer end is deflected at an angle to define what may be here described as a bend 16, and this is at an approximate obtuse angle and may be said to be obliqueangled. The angle is gradual and the bend is short and the terminal of the bend is finished and shaped in the manner shown at 18 so that it provides a satisfactory blunt raking hook. The hook is sometimes referred to as a scoop and also a drag and in any event it is obvious that when properly handled it enables the meat which is lodged in inaccessible and limitary regions to be dislodged and withdrawn once the user becomes accustomed to the meat stripping technique.

As is the situation with all tools and implements, different users will soon catch the knack of employing the implement although modes and mannerisms of users may vary.

It is thought that persons skilled in the art to which the invention relates will be able to obtain a clear understanding of the invention after considering the description in connection with the drawings. Therefore, a more lengthy description is regarded as unnecessary.

Minor changes in shape, size and arrangement of details coming within the field of invention claimed may be resorted to in actual practice, if desired.

Having described the invention what is claimed as new is:

A stainless steel lobster pick adapted to form a complement to a regulation table set-up for the serving of lobster in a restaurant, the home, or elsewhere comprising a unitary implement resembling a table knife and having a conventional style knife-handle and a knife-like blade integral with said handle, said blade being flexibly resilient and comparatively short to meet the special requirements at hand, being wide at its junctural connection with the handle and then gradually decreased in width toward its outer free end, the latter terminating in a short oblique-angled bend having a blunt and arcuately rounded tip, said bend serving as hook which latter expedites the technique scooping and dragging the meat from its otherwise limitary regions.

References Cited in the file of this patent

UNITED STATES PATENTS 162,606    Berger    Apr. 27, 1875